US007299477B2

(12) United States Patent
Robinson

(10) Patent No.: US 7,299,477 B2
(45) Date of Patent: Nov. 20, 2007

(54) IDENTIFICATION OF THE SOURCE OF A CLIENT/SERVER FLOW

(75) Inventor: Ian Robinson, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 10/132,137

(22) Filed: Apr. 25, 2002

(65) Prior Publication Data

US 2002/0184296 A1 Dec. 5, 2002

(30) Foreign Application Priority Data

May 30, 2001 (GB) ................................. 0113141.6

(51) Int. Cl.
*G06F 3/00* (2006.01)
*G06F 15/16* (2006.01)
*G06Q 40/00* (2006.01)
*G06Q 99/00* (2006.01)
*G06F 7/04* (2006.01)

(52) U.S. Cl. .................. 719/313; 705/39; 705/64; 709/202; 709/203; 726/16

(58) Field of Classification Search ............. 718/101, 718/106–108, 102, 104; 705/35, 39–44, 705/64–79; 713/167; 719/311–316, 328–332; 707/1–10; 709/201–207, 213–219; 726/16–21

See application file for complete search history.

(56) References Cited

U.S. PATENT DOCUMENTS 5,089,954 A    2/1992   Rago
5,706,429 A *  1/1998   Lai et al. ................... 709/230

(Continued)

FOREIGN PATENT DOCUMENTS

JP        07-319831        12/1995

(Continued)

OTHER PUBLICATIONS

"CORBA Programming—Concept and Design of IDL", Jun. 24, 1999, 9 pages.

(Continued)

*Primary Examiner*—William Thomson
*Assistant Examiner*—Charles E Anya
(74) *Attorney, Agent, or Firm*—Stephen R. Tkacs; Stephen J. Walder, Jr.; Jeffrey S. LaBaw

(57) ABSTRACT

In standards, such as the Object Management Group Inc. CORBA standard, a context is defined, for inclusion with an inter-process flow, which comprises a standard section and a free format, provider specific, section. An object identifier to identify the target of a request is added to the free format section of the request context and/or the free format section of the reply context that results from the request. This enables the server that receives the request and/or the client that receives the response to deduce that the content of free format section was added to the context by the process from which the flow was received. Further enhancement is obtained by adding a reply/request indicator to indicate the direction of the flow for which the free format section was built, and level identifier information to identify the product id and version number of the product that built the context.

36 Claims, 9 Drawing Sheets

U.S. PATENT DOCUMENTS

| | | | |
|---|---|---|---|
| 5,920,863 A | | 7/1999 | McKeehan et al. |
| 5,923,879 A | * | 7/1999 | Sasmazel et al. ............ 717/143 |
| 6,038,589 A | | 3/2000 | Holdsworth et al. |
| 6,134,594 A | * | 10/2000 | Helland et al. .............. 709/229 |
| 6,295,541 B1 | * | 9/2001 | Bodnar et al. ............... 707/203 |
| 6,542,922 B1 | * | 4/2003 | Chessell et al. ............. 709/203 |
| 6,973,657 B1 | * | 12/2005 | Ahmad et al. ............... 719/315 |

FOREIGN PATENT DOCUMENTS

| | | |
|---|---|---|
| JP | 10-187637 | 7/1998 |
| JP | 2000-224262 | 8/2000 |
| JP | 2001-222514 | 8/2001 |
| JP | 2002-175284 | 6/2002 |
| JP | 2003-015891 | 1/2003 |
| WO | WO 01-01272 | 6/2000 |

OTHER PUBLICATIONS

Rosen et al., "CORBA & COM Integration Guide", Shoeisha, Mar. 31, 2000, 8 pages.

"Internet Programming, Starting with Ruby", Open Design, Aug. 1, 2000, 5 pages.

Nishioka et al., "The Security Model of OZ: an Object-Oriented Distributed Systems Environment", Aug. 22, 1997, 7 pages.

* cited by examiner

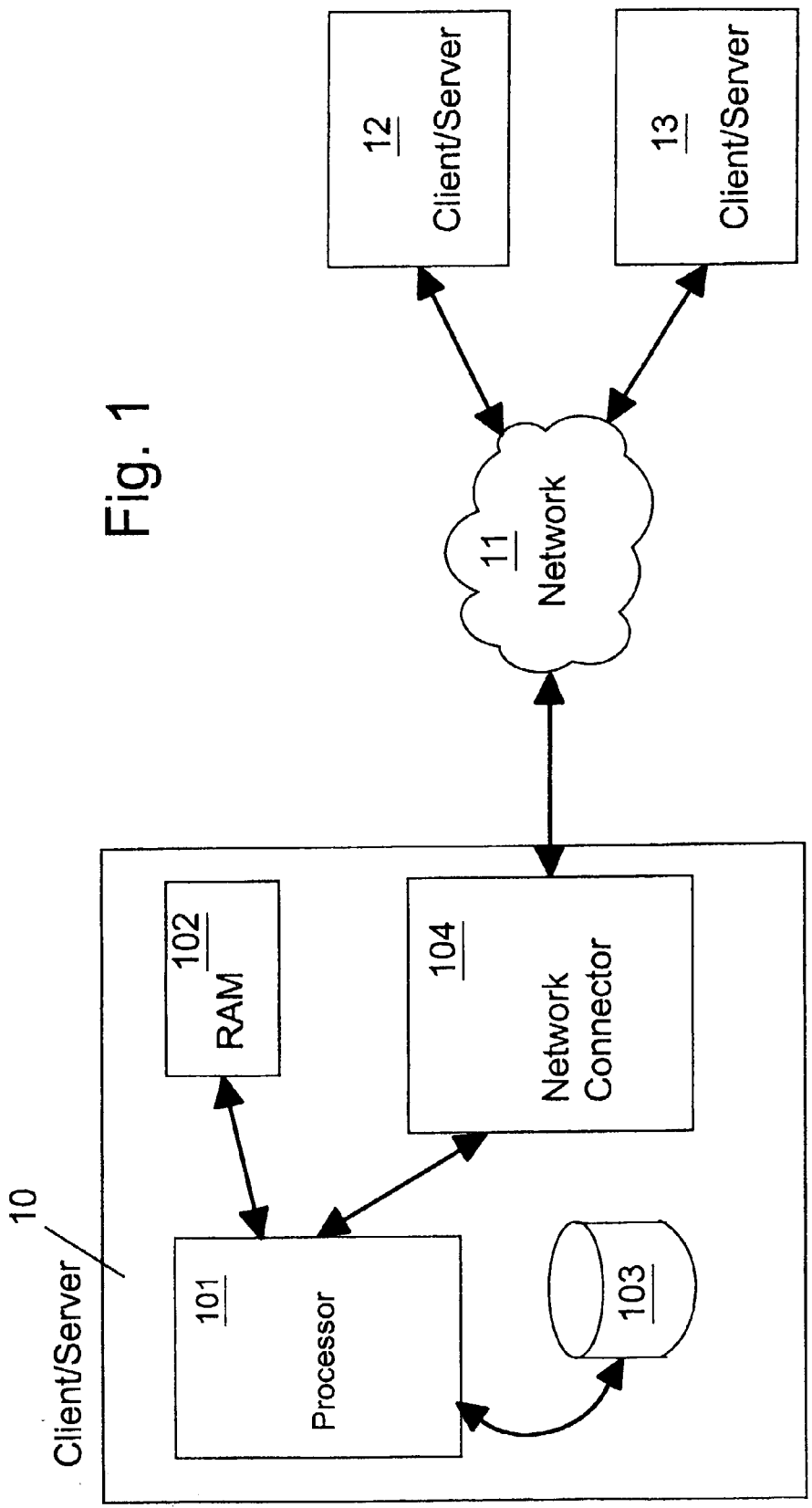

IDENTIFICATION OF THE SOURCE OF A CLIENT/SERVER FLOW

FIELD OF THE INVENTION

The present invention relates to client/server communication according to a set of standards and more specifically to flowing information to enable clients and servers to identify the source of flows.

BACKGROUND OF THE INVENTION

Client/server computing has become more and more important over the past few years in the information technology world. This type of distributed computing allows one process (the client) to delegate some of its work to another process (the server) that might, for example, be on a different machine and be better suited to perform that work. For example, the server could be on a high-powered computer running a database program managing the storage of a vast amount of data, while the client could be on a desktop personal computer (PC) which requests information from the database to use in one of its local programs. Note that "client" is used to refer to a process that sends a request and this could refer to either a pure client process, that is not capable of receiving requests, or a server process behaving as a client. "Server" is used to refer to the process that receives a request, and generally all servers are capable of being clients. Note also that computers are generally capable of running more than one process and so it cannot be assumed that the terms client and server refer to any particular computer.

Use of Object Oriented Programming techniques is commonplace in client/server systems and typically an object in a client, requests an object in a server, to carry out work on its behalf. For example, when an object in a client process wishes to make a request to an object in a server process, it first locates a server that supports that object. Having found a suitable server it then either creates a new instance, or finds an existing instance, of the required server object, before sending it the request for work to be done. The request may, for example, be a method to call with a list of input and output parameters. The server object may then return results from the method call.

Note that in processing a client request, a server object may delegate some work to another server object in a different server. As a result the original client request can involve a chain of servers where, for a given server, servers ahead of the given server in the chain (i.e.: nearer to the original client) are upstream servers and servers behind a given server in the chain are downstream servers.

In a typical client or server, the programs that run can be logically divided into application software, system software and the operating system. In the example described the application software could be the client object and the server object, which perform the basic function of the application, for example obtaining the balance on a bank account and displaying it to the user. The system software then provides services to the application software in order to minimise the complexity of applications, such that the application programmer primarily need only be concerned with application functionality. For example, the systems software will provide services to locate servers that support given objects, communicate requests to different servers, provide transaction support etc. As a result the application software and system software are usually produced by different organisations. The operating system provides underlying services to application and systems software.

The system software handles communication between clients and servers and must provide a consistent set of services to the application program whichever client or server the application is executed in. In a distributed client/server computing environment, it is most advantageous if work can be freely delegated around a network as this enables, for example, a client application to obtain data that has been consolidated from information available from several different servers on several different machines. However there are many providers of system software and whilst the software from a single provider should provide this capability, a set of servers from a variety of providers will only be able to do so if they agree, for example, a common way to communicate. As a result organisations exist that define standards such that if client/server system software of different providers conform to the standards specified, their clients and servers can communicate and delegate work to each other.

One such organisation is the Object Management Group, Inc. (OMG) which is an international consortium of organisations involved in various aspects of client/server computing, on heterogeneous platforms, with distributed objects. The OMG has set forth published standards for client/server communication and application services. These standards are specified in the Common Object Request Broker Architecture (CORBA (Trademark of Object Management Group, Inc.)). The clients and servers of system software that conform to these standards are able to communicate and provide a consistent set of standard services to the application. Hence adherence to these standards by different system software providers ensures that clients and servers of those providers can distribute work to each other.

As part of the CORBA standards, the OMG has also set forth standards related to a transactions service. The transactions standards are known as the OTS or Object Transaction Service. See, e.g., CORBA Object Transaction Service Specification 1.1, available from http://www.omg.org. Computer implemented transaction processing systems are used for critical business tasks in a number of industries. A transaction defines a single unit of work that must either be fully completed or fully purged. For example, in the case of a bank automated teller machine from which a customer seeks to withdraw money, the actions of issuing the money, reducing the balance of money on hand in the machine and reducing the customer's bank balance must either all succeed or all fail. Failure of some but not all of the subordinate actions would lead to inconsistency between the records and the actual occurrences. With this type of transaction the sort of benefit that a standard such as OMG can provide is that a transaction can span two different banks using client/server software from two providers if both providers conform to the OMG OTS standard. The standard achieves this by specifying an interface to a set of transaction services with details of how the service should work and how the service should communicate the presence of the transaction between clients and servers.

One drawback of standards conformance is that it can be difficult for system software providers to provide additional or improved functionality over the standard and/or competitor software. This is because, when a client makes a request, it cannot be sure as to which server will process the request. Similarly when a server receives a request, it cannot be sure as to which client sent the request. As a result, it is difficult to deviate from flows specified by the standard, even in communication between a client and a server from the same provider.

However the standard does make some allowance for different behaviour between system software providers by use of a context. The OMG standards specify a data section, known as a context, which is included with a standard flow from one process to another. The context is not critical to the delivery of the request but enables client/server processes to exchange information. The contents of the context are largely specified by the standard but also include a pre-defined free format section which is available for the exchange of provider specific data. For example, the OTS standard defines a propagation context for a transactional flow which is used to communicate, in a standards specified format, the identity of the transaction under which the flow was made. However, the standard also specifies that the propagation context includes an optional, effectively free format, section known as the implementation specific data (ISD). Client/server processes can use this section to exchange information that is not part of the standard.

A specific problem with using the ISD is how to ensure that any received ISD was created by the sending client and not simply passed on from a different client. For example, consider a transaction which is distributed across client/servers A-B-C, where A and C have an OTS implementation of one provider, say provider X, and B has another. The OTS implementation of A and C uses the ISD in a request flow to indicate "provider X" and the ISD in a reply flow to return additional information to a provider X client. If A sends ISD to B then B will not understand it and cannot use it. If B calls C, it may pass its own ISD it may pass A's ISD or it may pass none. C's biggest problem occurs when B passes A's ISD as it contains "provider X" and appears to C to have come from a provider X client. As a consequence C includes additional data, intended for A, in the ISD associated with its reply flow. However B receives this reply and may then decide to reply to A either with no context or with a context that includes the ISD originally received from A. This would result in the additional information being lost and, if the additional information is critical, an undefined failure of the transaction. Given that this scenario is possible, even if unlikely, the ISD cannot be used for this purpose as a transaction service that causes transaction failures in certain scenarios would not be acceptable.

SUMMARY OF THE INVENTION

The present invention is concerned with the use of pre-defined and optional data in a context flowed between client and server and more specifically as to how optional data can be used, with a client/server flow, in a manner that enables the recipient of a flow to determine whether or not the optional data in the context was included by the client or server from which the flow was received.

According to a first aspect the present invention provides a data processing method for running in a process on a data processing system, the method comprising the steps of: building a context for inclusion in a flow to a different process in the same or a different data processing system, wherein the context comprises pre-defined and optional data; and flowing the context to the different process as part of a flow wherein the flow is one of a request to and a reply from a program entity; characterised in that the optional data comprises identity information which identifies the program entity.

According to a second aspect the present invention provides a data processing method for running in a process on a data processing system, the method comprising the step of: receiving a context included with a flow from a different process in the same or a different processing system, wherein the context comprises pre-defined and optional data and wherein the flow is one of a request to and a reply from a first program entity; characterised in that the optional data comprises identity information, which identifies a second program entity, and the method further comprises the step of: responsive to the first and second program entities being the same, determining that the different process also added the optional data to the context.

According to a third aspect the present invention provides computer program product comprising instructions which, when executed on a data processing system causes said system to carry out the methods of the first or second aspects.

According to a fourth aspect the present invention provides a data processing system comprising: a process wherein the process comprises: means for building a context for inclusion in a flow to a different process in the same or a different data processing system, wherein the context comprises pre-defined and optional data; and means for flowing the context to the different process as part of a flow wherein the flow is one of a request to and a reply from a program entity; characterised in that the optional data comprises identity information which identifies the program entity.

According to a fifth aspect the present invention provides a data processing system comprising: a process wherein the process comprises: means for receiving a context included with a flow from a different process in the same or a different processing system, wherein the context conforms to a pre-defined standard and comprises optional data and wherein the flow is one of a request to and a reply from a first program entity; characterised in that the optional data comprises identity information, which identifies a second program entity, and the process further comprises: means, responsive to the first and second program entities being the same, for determining that the different process also added the optional data to the context.

The invention thus provides the ability to build a context, for attaching to a flow between processes, which includes information in pre-defined and optional data which enables the recipient of the context to determine whether the optional data was added by the process from which the flow was received. The context could be attached to a request flow or a reply flow. The information comprises an identifier of the program entity which was the target of the request from which the request or reply flow resulted. The program entity could be, for example, a C++ object or a Java™ bean. This enables the recipient to deduce that the process from which the flow was received added the optional data to the context. The process that builds a context for inclusion with a request flow is a client and the process that builds a context for inclusion with a reply flow is a server.

The invention also provides the ability to determine if pre-defined and optional data, received in a context attached to a flow from another process, was also added by that process. The context could be attached to a request flow or a reply flow. The optional data comprises an identifier for a program entity. If this identifier identifies the program entity that was the target of the request from which the request or reply flow resulted, the recipient can determine that the optional data was added to the context by the process from which the flow was received. This can be useful for a variety of reasons. Examples are: the recipient of a context can establish whether or not other information included in the free format section of the context was intended for it; a server can use it to confirm to a client that it received data sent from the client; and a server can establish that the client will receive and understand data included in the reply context. Note that the process that receives a context with a request flow is a server and the process that receives a context with a reply flow is a client.

Preferably, if it is determined that the optional data, received in a context attached to a flow from another process, was also added by that process, the process that receives the flow adopts nonstandard behaviour in future communication with the process from which the flow was received. Nonstandard behaviour covers such things as using the free format section of the context to pass additional information between servers or initiating system software flows that are not defined in the standard. These may be used in conjunction with standard flows and could be, for example, for improving performance.

Preferably the context is built to further comprise a flow direction indicator in the optional data. This is used to indicate whether the optional data was built for inclusion with a request flow or a reply flow and provides the advantage of being able to use the present invention to build contexts for inclusion with (and receive contexts included with) both request and response flows. As a result a process that receives a context can establish that the optional data was built for inclusion in the flow that it has received. This is required, for example, if it is possible for a process, to which a request is sent, to simply return, in the reply context, the optional data that it received in the context with the request.

Preferably the context is built to further comprise level identification information in the optional data. The level indicator information may contain information such as a product id and version number, or a function level identifier. For example, if two or more providers adopt the present invention, and use the same locations in the optional data to store information according to the present invention, the level information is used to distinguish between providers and therefore make the invention useful for the reasons previously stated (i.e.: for example, a server can establish that the client will receive and understand data included in the reply context). The level identification information can be further used by the recipient of the context to, when appropriate, adopt a nonstandard behaviour according to the level contained in the level indicator information. For example the one type of nonstandard behaviour could be adopted for one recognised level and a different type of nonstandard behaviour adopted for a different recognised level.

An alternative to level identification information requires the context to further comprise a pre-defined standard section, the standard section comprising a reference to a program entity which is of a standard specified type. In this case the process which builds a context further sets this reference to a program entity instance which both conforms to the standard specified type and a nonstandard type. The recipient of the context may then establish that the program entity instance is also of this nonstandard type. This provides information that can be used for the similar purposes as the level identification information.

Preferably the optional data of the context is pre-defined by the CORBA standard of the Object Management Group.

Preferably the context is a propagation context as specified for the CORBA Object Transaction Service (OTS), and the flows involved are transactional. In this case the pre-defined and optional data of a context is the implementation specific data of the propagation context defined by the standard for the OTS.

BRIEF DESCRIPTION OF THE DRAWINGS

A preferred embodiment of the present invention will now be described by making reference to the following drawing figures:

FIG. 1 is a block diagram of a data processing environment in which the preferred embodiment of the present invention can be advantageously applied;

DESCRIPTION OF THE PREFERRED EMBODIMENT

Figure 2A:
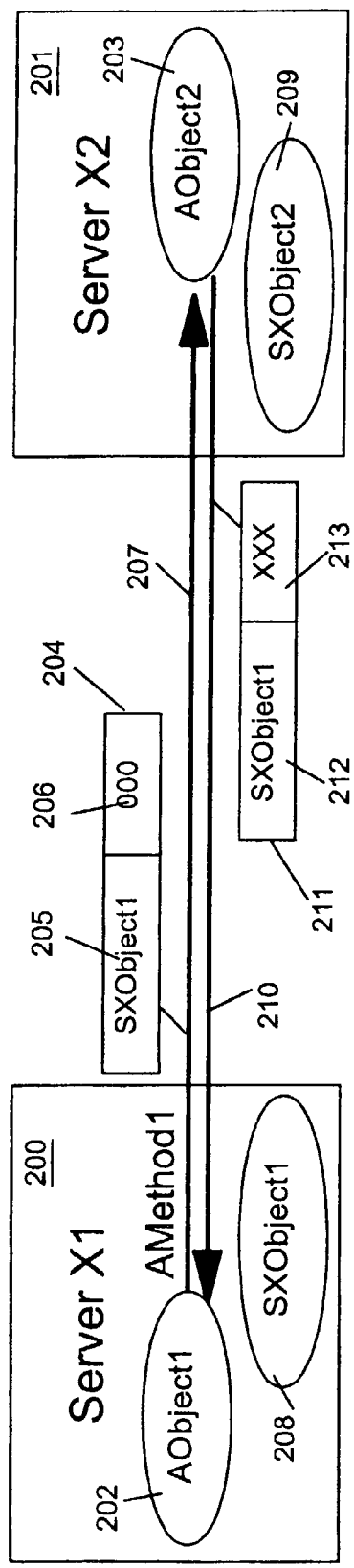
FIGS. 2a and 2b are a schematic representations of client to server flows and contexts flowed, according to the prior art.

In FIG. 1, a client/server data processing apparatus 10 is connected to other client/server data processing apparatuses 12 and 13 via a network 11, which could be, for example, the Internet. The client/servers 10, 12 and 13 interact with each other, in the preferred embodiment, to carry out work, such as the processing of transactions (e.g., updates to bank accounts). Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

Although each client/server in FIG. 1 is capable of sending and receiving messages from the network, whether they behave as client and/or servers will depend on the programs that are used to control their operation. These programs can often run several processes on each client/ server and these processes can be client or server processes. As a result it is possible for a client/server data processing apparatus to run several processes some of which behave as clients on the network and others that behave as servers on the network.

In the situation where the clients and servers conform to standards, such as those specified by the OMG, it can be difficult for providers of the systems software which runs on those clients and servers to provide additional functionality over the standard. Note that in the description that follows: the provider of a client/server is used to refer to the provider of the systems software which runs on the client/server; "standards" is used to refer to the CORBA standards, although it could equally apply to other standards that adopt features similar to the specific features required for the present invention; and the program entities involved are C++ objects.

One difficulty in adopting nonstandard behaviour S when also conforming to standards is described with reference to FIGS. 2a, 2b, 3 and 4. In these figures a server wishes to return additional information to the client in a reply context which in this case is knowledge of an object in the server. FIG. 2a shows two servers, ServerX1 (200) and ServerX2 (201). The systems software for these servers are from the same provider, provider X. When application object AObject1 (202) in ServerX1 (200) calls application AObject2 (203) in ServerX2 (201), the systems software in Server1 (200) intercepts the request and builds a request context (204) that is used to flow extra information with the request flow (207). The format of this context is specified by the standards and comprises a standard section (205), and a free format section (206) for optional use by different providers. The standard section includes a reference to a standards specified object instance, such as depicted by object instance SXObject1 (208) and the free format section (206) is null. SXObject1 (208) is an instance of an object that conforms to the specified standard, but in this example, as implemented by provider X, provides an additional nonstandard method XMethod1.

Figure 3:
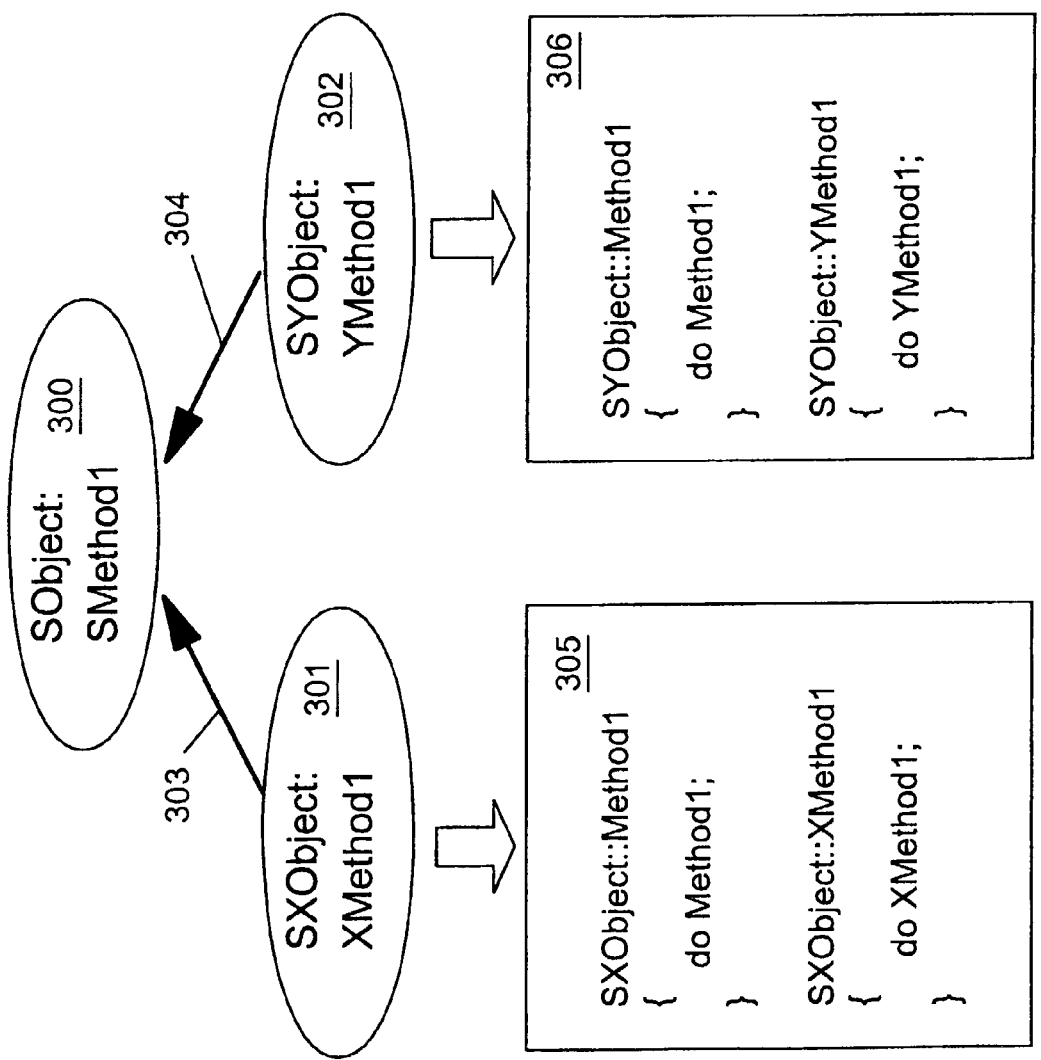
FIG. 3 is a schematic representation of object inheritance according to the prior art.

How SXObject1 (208) provides this nonstandard method is a well known object oriented programming technique, and is depicted in FIG. 3. This shows that the SXObject class (301) inherits, as depicted by an arrow (303), the standards specified SObject class (300). The SObject class (300) defines method SMethod1 and the SXObject class defines method XMethod1. The implementation of SXObject (305) then includes the implementation for both methods. As a result an instance of the SXObject class (300), such as SXObject1 (208) in FIG. 2a, can be addressed as an object of either type SObject or type SXObject. When it is addressed as an SObject type, only SMethod1 can be called on it, but when it is addressed as an SXObject type, both SMethod1 and XMethod1 can be called on it.

Note that when the reference to an instance of the SXObject class (301) is added to the standard part of a context, it is added as if it was an object of SObject class (300) because that is what the standard specifies. As a result, when a server receives this reference it must treat it, by default, as reference to an instance of the SObject Class (300). However the CORBA standard specifies a narrow function that enables traversal down the inheritance structure. This allows the recipient server to attempt to narrow the received SObject instance to an SXObject instance. If this succeeds the object instance is addressed as an instance of the SXObject class (301) and the recipient knows that the object was created by a client of provider X. However, if it fails, the object reference is addressed as an instance of the SObject class (300) and the recipient knows that the object was created by a client of a provider other than provider X.

Returning to FIG. 2a, when the request flow (207) arrives in ServerX2 (201) the system software intercepts the request, reads information from the context (204) and then: successfully narrows the referenced SObject instance in the context to an SXObject instance, thus deducing that it was created in a server from provider X; creates or finds an existing standards specified object instance, such as SXObject2 (209); and delivers the request to application object AObject2 (202). When this request completes the system software intercepts the reply and adds information to the free format section (213) of the reply context (211) which is included with the reply flow (210). This information is intended for ServerX1 (200) and could be, for example, details of SXObject2 (209) which Server1 (201) would gain knowledge of and hence be able to call using XMethod1.

Figure 2B:
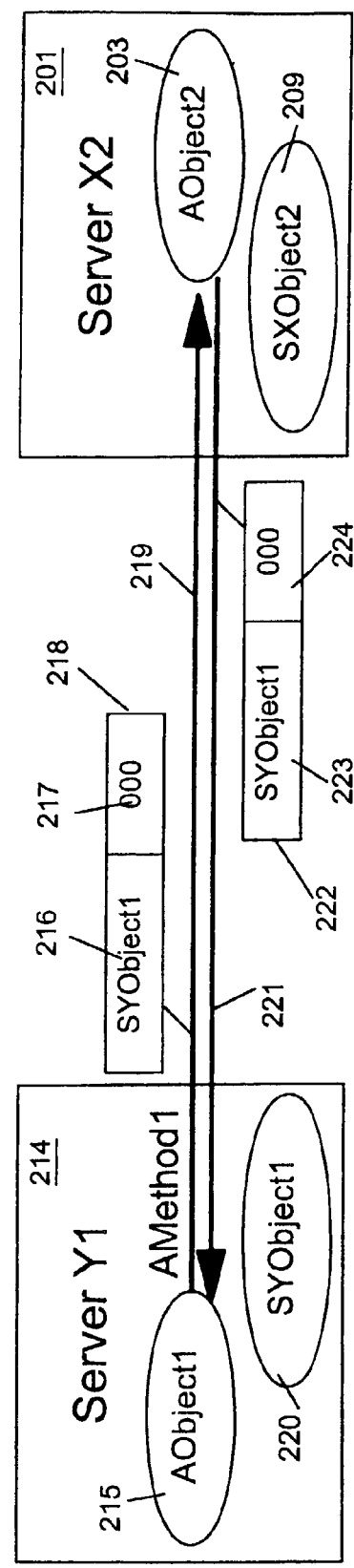

FIG. 2b shows a similar scenario to FIG. 2a, but this time application object AObject3 (215) in ServerY1 (214) calls application object AObject2 (203) in ServerX2 (201). Note that in the figures, where a like part is included in more than one figure, it is given the same reference number in each figure. The systems software for ServerY1 (214) is provided by provider Y. This request is handled much as before, except that the request context (218) sent with the request flow (219) now includes a reference to object instance SYObject1 (220) in the standards specified section (216). SYObject1 (220) is an instance of provider Y's version of the standards specified SObject class (300). SYObject1 (220) includes support for the standards specified method SMethod1, but not the nonstandard method, XMethod1, of provider X. On receipt of the request flow (219), ServerX2 (201) once again attempts to narrow the referenced SObject instance in the request context (218) to an SXObject instance, but this fails. As a result, ServerX2 (201), when processing the reply to the request, does not include any additional data in the free format field (224) of the reply context (222) because it knows that the request was received from a foreign (that of a different provider) client.

Figure 4:
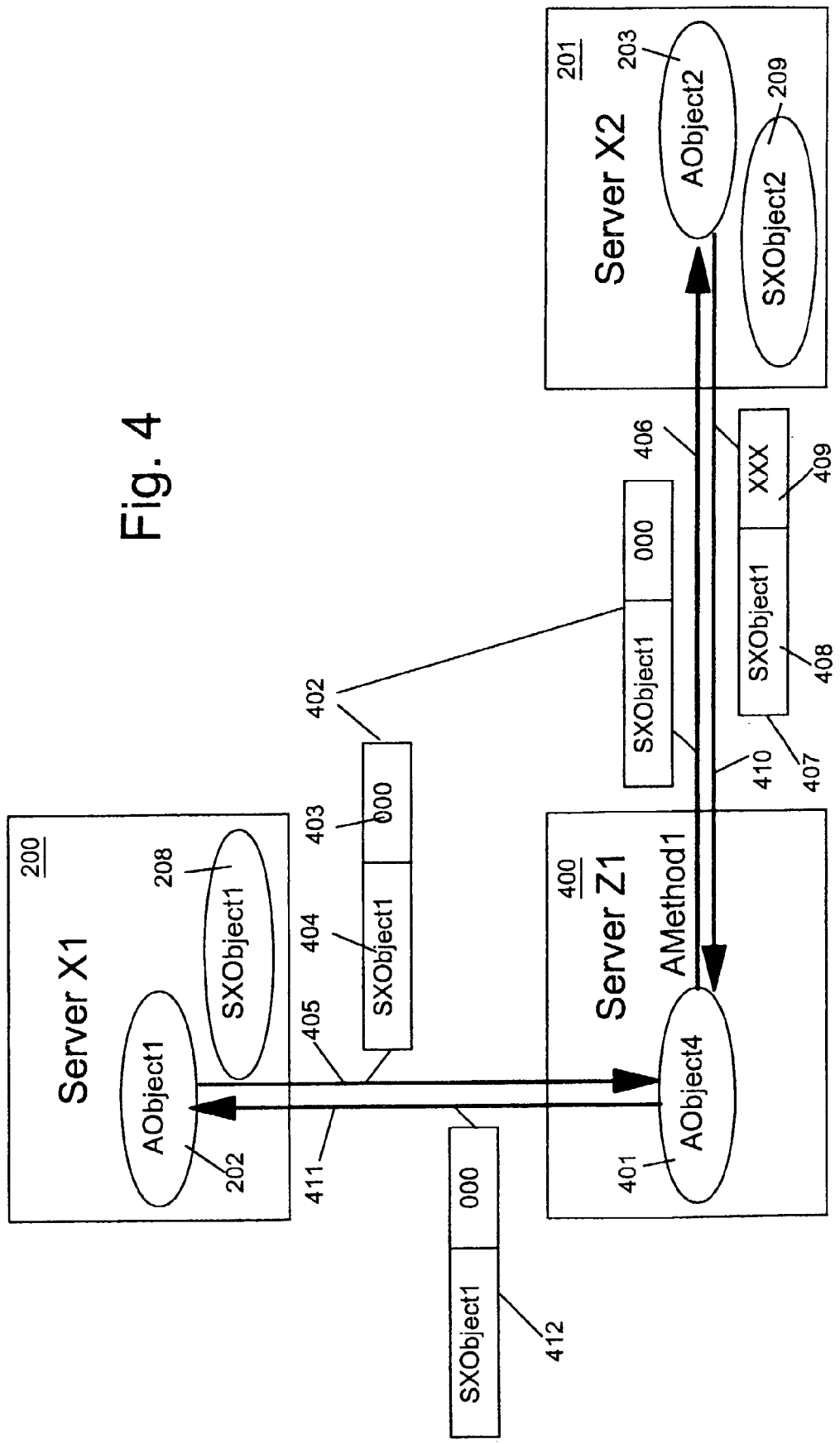
FIG. 4 is a schematic representation of a client to server flow, that involves an intermediate server, and contexts flowed, according to the prior art.

However, the problem with this technique is that the receiving server assumes that the reference to an instance of the SObject class, in the standard section of request context, was added by the calling client. However this assumption does not always hold and this is illustrated in FIG. 4. In this figure, application object AObject1 (202) in ServerX1 (200), calls application object AObject4 (401) in ServerZ1 (400), which then calls application object AObject2 (203) in ServerX2 (201). The call from AObject1 (202) is processed in much the same way as described in FIG. 2a, such that the standards specified section (404), of the request context (402), includes a reference to SXObject1 (208). On receipt of the request ServerZ1 (400) passes the request to AObject4 (401) which then calls AObject2 (203) in ServerX2 (201). The systems software in ServerZ1 (400) intercepts this request and attaches to it the request context (402) that it received from ServerX1 (200). Now when the request to AObject2 (203) arrives in ServerX2 (201), the systems software in ServerX2 (201) successfully narrows the referenced SObject instance in the request context (402) to an SXObject instance, and therefore incorrectly deduces that the request was sent from a provider X server. As a result ServerX2 (201) adds additional data, intended for ServerX1, to the free format section (409) of the reply context (407). ServerZ1 (400) receives this reply but does not understand the data in the free format section (409) and ignores it. Eventually AObject4 (401) returns and a reply is sent to ServerX1 (200). The system software in ServerZ1 (400)

intercepts this reply and attaches to the reply flow (411) a reply context (412) the same as the request context (402) originally sent to it by ServerX1 (200). As a result the additional information in the free format section (409) of the reply context (407) from ServerX2 (201) is lost. In this case, if the context involved is a transaction context and if the additional information is crucial to that transaction, the transaction will ultimately fail. Note also that the same problem would occur if ServerZ1 (400) did not attach a context to the reply flow (411).

As a result the problem, in this scenario, is how can provider X ensure that ServerX2 (201) can determine that the request context (402) that was received from ServerZ1 (400), was actually sent from ServerZ1 (400) and not ServerX1 (200), when it has no control over the systems software on ServerZ1 (400).

The solution, according to the present invention is to add an object identifier, for the object that is the target of the request, to the free format section of the request context. As a result, when a server receives a request, if the free format section of the request context includes an identifier for the object to which the request is targeted, the recipient of the request knows that the sender of the request also provided the free format section of the request context.

Figure 5A:
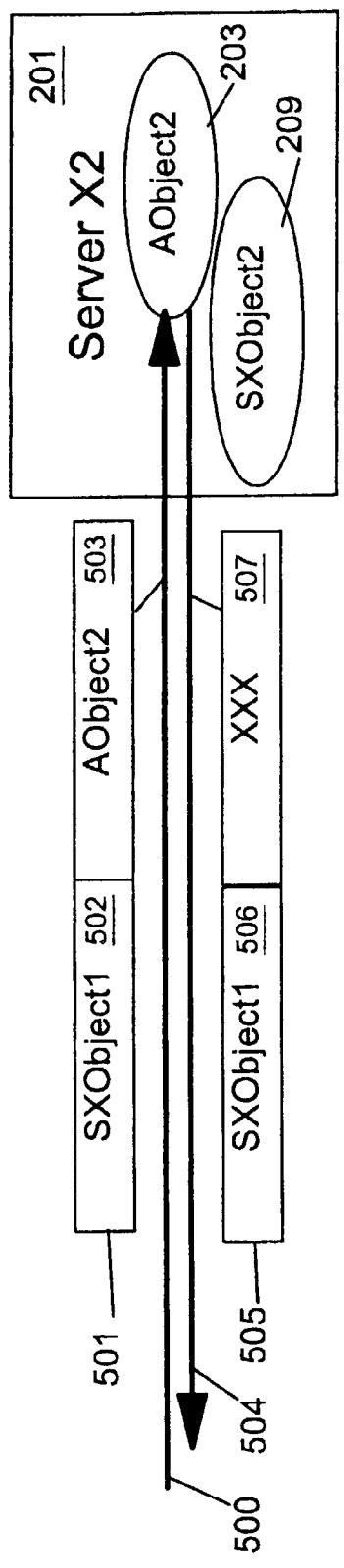
FIGS. 5a and 5b are schematic representations of a client to server flows and contexts that may be received by the server, according to the preferred embodiment of the present invention.

FIG. 5a illustrates this solution. ServerX2 (201) receives a request flow (500) targeted at AObject2 (203). Attached to this flow is a request context (501) which contains a reference to an SObject instance in the standard section (502) and identity information for object AObject2 in the free format section (503). Because the free format section (503) correctly identifies the target object, and if provider X is the only provider to use this technique, this is all the information ServerX2 (201) needs to deduce that the request was sent directly from a provider X client. As a result, additional data can be added to the free format section (507) of the reply context (505) included on the response flow (504).

If provider X is not the only provider to use this technique, ServerX2 (201) can fall back on attempting to narrow the SObject instance, received in the standard section (502) of the request context (501), to an SXObject instance. If this succeeds it can be deduced that the request was sent directly from a provider X client. Although this deduction is flawed in the scenario described for FIG. 4 it is most likely to be valid under the present invention. This is because, now, for narrow to succeed and therefore give the wrong indication, the foreign client must update the free format section (to add the correct target object id) but not the standard section of the request context, which is most unlikely.

Figure 5B:
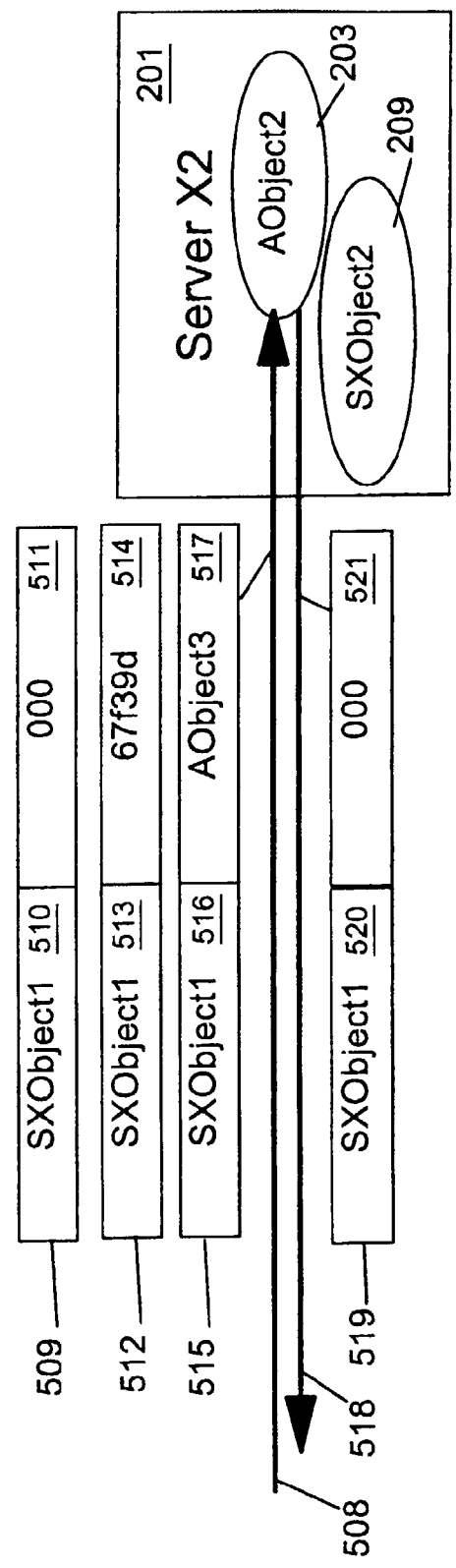

FIG. 5b shows additional flows that ServerX2 might receive from servers that do not use the solution provided by the present invention. In all of these cases the references to object instances included in the standard sections (510, 513, 516) of request contexts (509, 512, 515) can be successfully narrowed to an SXObject instance. However in each case the free format sections (511, 514, 517) do not contain identity information for the target object AObject2 (203), and so it can be deduced that each request was sent either by a non-provider X client or a provider X client that was implemented prior to adoption of the present invention. As a result the reply context (519) is the same in each case with no additional data in the free format section (521).

Heretofore the present invention has only been described in terms of adding an identifier for the target object to the optional, free format section of a request context. However the present invention can also be applied to a reply context. This and further improvements on the preferred embodiment of the present invention are now described with reference to FIG. 6. In this figure AObject1 (202) has sent a request to AObject5 (601) and received a reply flow (602). The figure shows 5 different reply contexts (603, 606, 609, 612,615) that ServerX1 (200) could receive according to these improvements.

Context 603, includes in the free format section (605) the identity information for the target object AObject5 (601). This can be used, for example, if a client sends additional information in a request context to a server and wishes to confirm that the information was received by and understood by the server. The server can indicate that this was the case by adding to the free format section of a reply context an identity information for the target object to which the original request was targeted. When the client receives this it can check that the identity information identifies the object to which it sent the request and, if this is the case, it can deduce that the request was received by a server of the same provider.

Context 606, further includes in the free format section (605) a flow direction indicator that is used to indicate the direction of the flow for which the free format section (605) was added. This indicator is set to indicate either request or reply, and in this example "RP" is used to indicate that the direction of the flow is a reply. This provides the advantage of being able to concurrently use the present invention to enable both a server to deduce that a request was received from a client of the same provider and a client to deduce that a reply was received from a server of the same provider. This is because it enables a client to distinguish a foreign server that simply returns, in the reply context, the free format section that it received in the request context.

Figure 6:
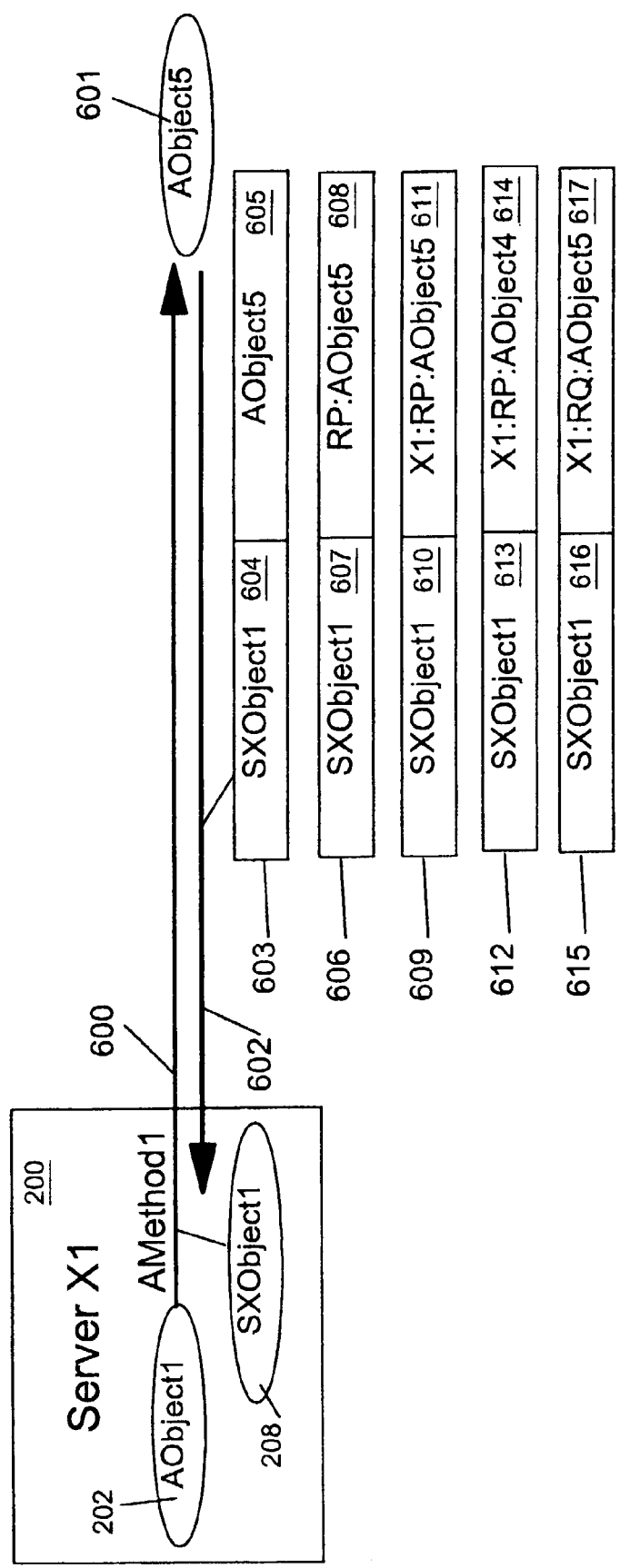
FIG. 6 is a schematic representation of a client to server flow and contexts that may be received by the client, according to the preferred embodiment of the present invention.

Context 609 further includes, in the free format section (611), level identification information. This is useful to distinguish between different implementations of the present invention either from different providers, or different levels from the same provider and in this example is set to "X1". As the present invention does not mandate any particular nonstandard behaviour that it can be used to identify, it may be that different implementations of the present invention will be used to signify different behaviours. As a result the level identification information can be used as an indication of the type of nonstandard behaviour that is supported. For example, two or more providers who co-operate to implement the same nonstandard behaviour can use the same level identification information. Conversely, for example, a given provider may use different level identification information to distinguish versions of its system software which adopt different nonstandard behaviour. Although this enhancement is illustrated in FIG. 6 for a reply context it can also be used in a request context. Indeed adoption of this aspect of the invention for a request context obviates the need to use narrowing as described in FIG. 5a.

Contexts 612 and 615 are illustrations of contexts from which ServerX1 would deduce that the request it sent to AObject5 (601) was processed by foreign server. Context 612 includes, in the free format section (614), an identity information for AObject4, which is not the target of the request. Context 615 includes, in the free format section (617), a flow direction indicator that is set to "RQ" to indicate that it was created for a request context.

Note that the contexts shown in FIGS. 5a, 5b and 6 cover only a subset of the possible combinations of data could be included in the provider specific data context according to the present invention and should not be treated as exhaustive.

Figure 7B:
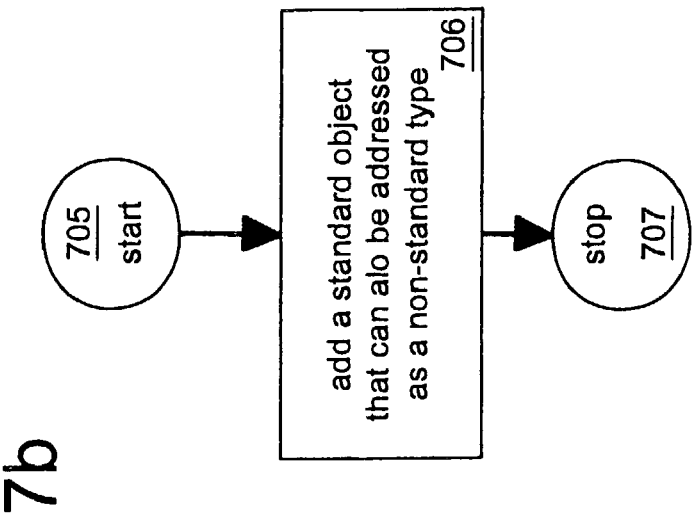
FIG. 7b is a flow diagram of the processing, in a client or server, when building data for inclusion in the standard section of a context for attachment to a flow according to the preferred embodiment of the present invention.
Figure 7A:
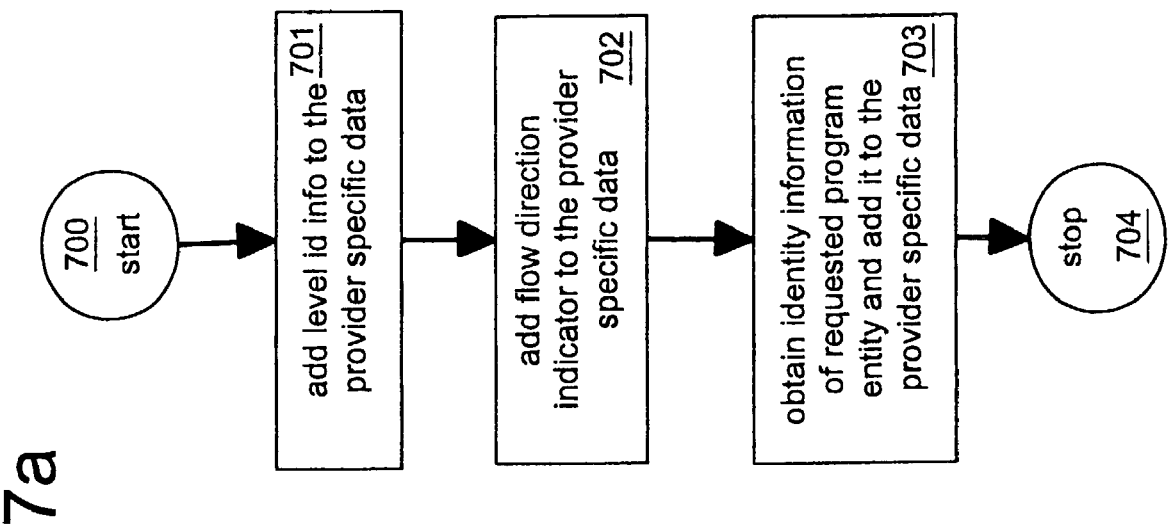
FIG. 7a is a flow diagram of the processing, in a client or server, when building provider specific data for inclusion in a pre-defined and optional section of a context for attachment to a flow according to the preferred embodiment of the present invention.

FIG. 7a is a flow chart of processing that is performed when adding data to the optional, provider specific, free format section of a context according to the preferred embodiment of the present invention. This may be performed in a client process for a request context or in a server process for a reply context. At the first step in the process (701) level identification information is optionally added. This identifies the provider and/or level of the systems software that is building the context and will typically be a string. At step 702 a flow direction indicator is optionally added. This indicates whether the data is included in a context for a request flow or a reply flow. Typically this indicator will be a binary value or a string such as "RQ", "REQ" or "REQUEST" to indicate request and "RP", "REP", or "REPLY" to indicate reply. At step 703 program entity identity information, to uniquely identify the program entity which is the target of the request, is obtained and added. For a reply this is the program entity that was the target of the request that resulted in the reply. The identity information could be the object id that is included in the information that is flowed to enable the request to be delivered to the correct object.

FIG. 7b is a flow chart of the processing when adding data to the standard section of the context. This processing is optional and only required if two or more providers are using the present invention and wish to differentiate their implementation without using the level identification information that is optionally added at step 701 of FIG. 7a. At step 706 a reference to an object instance of a standard specified class which can also be addressed as a nonstandard object instance, as described for FIG. 3, is added.

Figure 8B:
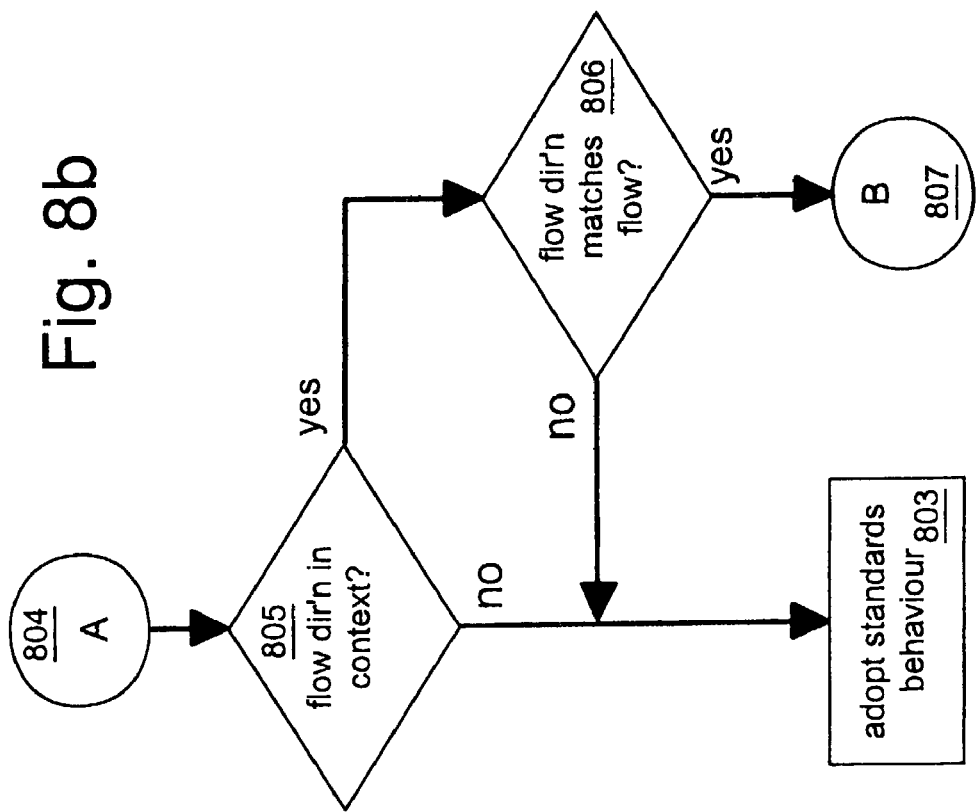
FIGS. 8a, 8b and 8c are flow diagrams of the processing, in a client or server, when receiving a context included with a flow according to the preferred embodiment of the present invention.
Figure 8A:
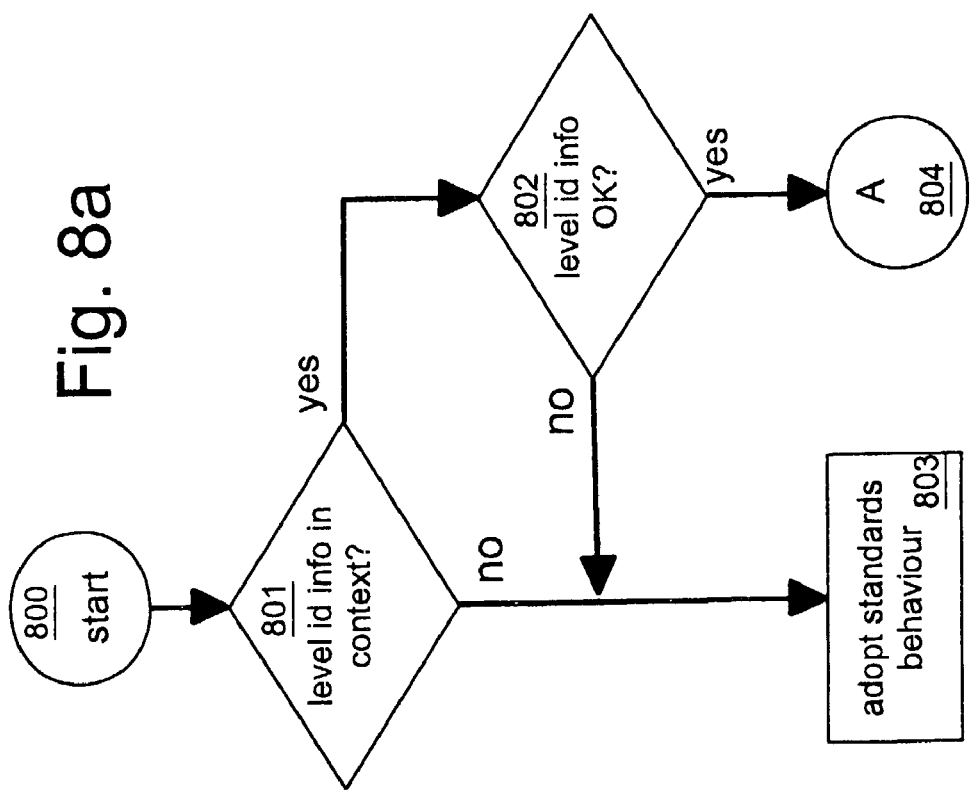
Figure 8C:
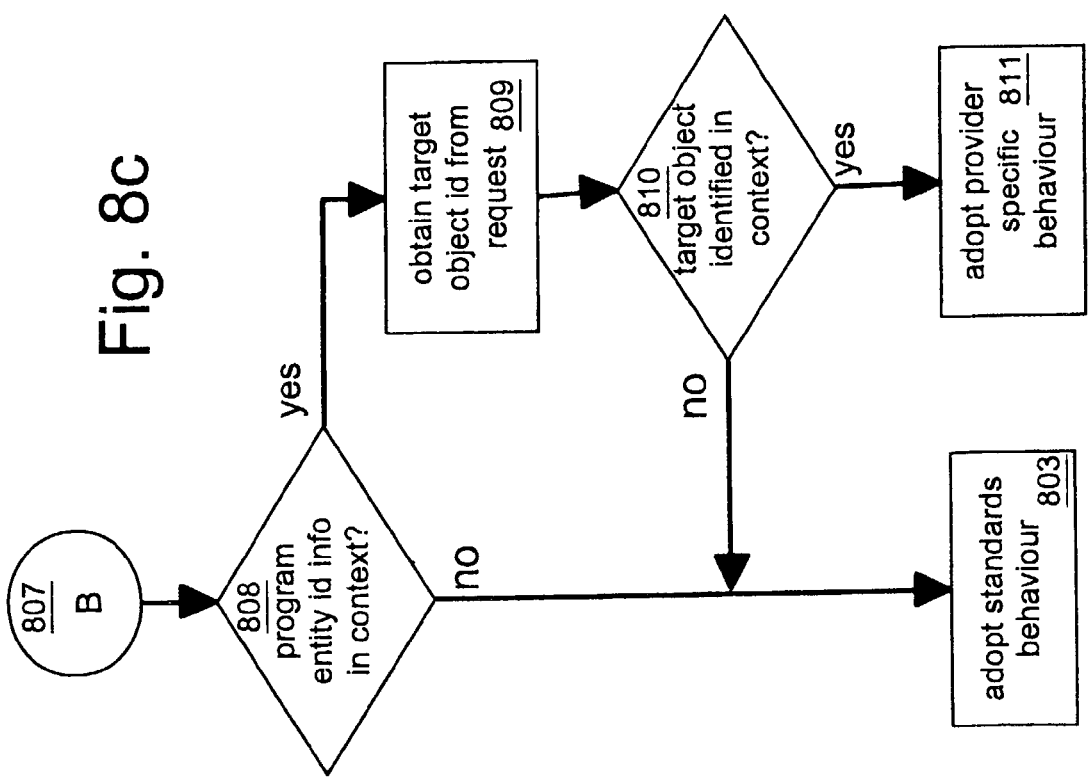

FIGS. 8a, 8b and 8c are flow charts of the processing that is performed when interpreting data contained in the optional, provider specific, free format section of a context, according to the preferred embodiment of the present invention. This may be performed in a server process for a request context or in a client process for a reply context.

FIG. 8a shows the processing of the level identifier information and is only required if step 701 of FIG. 7a was carried out. If this processing is not required, processing starts in FIG. 8b. At step 801 a check is made to see if level identifier information is included in the provider specific section. If level identifier information is included a check is made at step 802 to see if it is OK. It will be OK if it is recognised and the nonstandard behaviour that it indicates is known. If the identifier is OK the process continues to FIG. 8b. If level identifier information was not included in the data or the level identifier information that is included in not OK, the request or reply with which the context was received was from a foreign process and processing continues to step 803 where the client or server adopts standards specified behaviour when dealing the foreign process.

FIG. 8b shows the processing of the flow direction indicator and is only required if step 702 of FIG. 7a was carried out. If this processing is not required, processing continues or starts in FIG. 8c. At step 805 a check is made to see if a flow direction indicator is included in the data. If it is included at step 806 a check is made to see if the flow direction indicator matches the direction of the flow (request or reply) on which the data is included. If the direction matches processing continues to FIG. 8c. If the flow direction indicator is not included or does not match the direction of the flow, the request or reply with which the context was received was from a foreign process and processing continues to step 803 where the client or server adopts standards specified behaviour when dealing the foreign process.

FIG. 8c shows the processing of the program entity identity information. At step 808 a check is made to see if program entity identity information is included in the data.

If it is included, an identifier of the program entity that was actually the target of the request is obtained at step 809. This could be, for example, the program entity reference which is available in a client and a server as it is used for targeting the request. At step 810 a check is made to see if the program entity identity information in the provider specific data identifies the program entity obtained at step 809. If it does the processing continues to step 811 where the client or server adopts non-standard behaviour when dealing with the process from which the context that contained the provider specific data was received. If the program entity identity information was not included in the data, or did not correctly identify program entity that was the target of the request, the request or reply with which the context was received was from a foreign process and processing continues to step 803 where the client or server adopts standards specified behaviour when dealing the foreign process.

Figure 9:
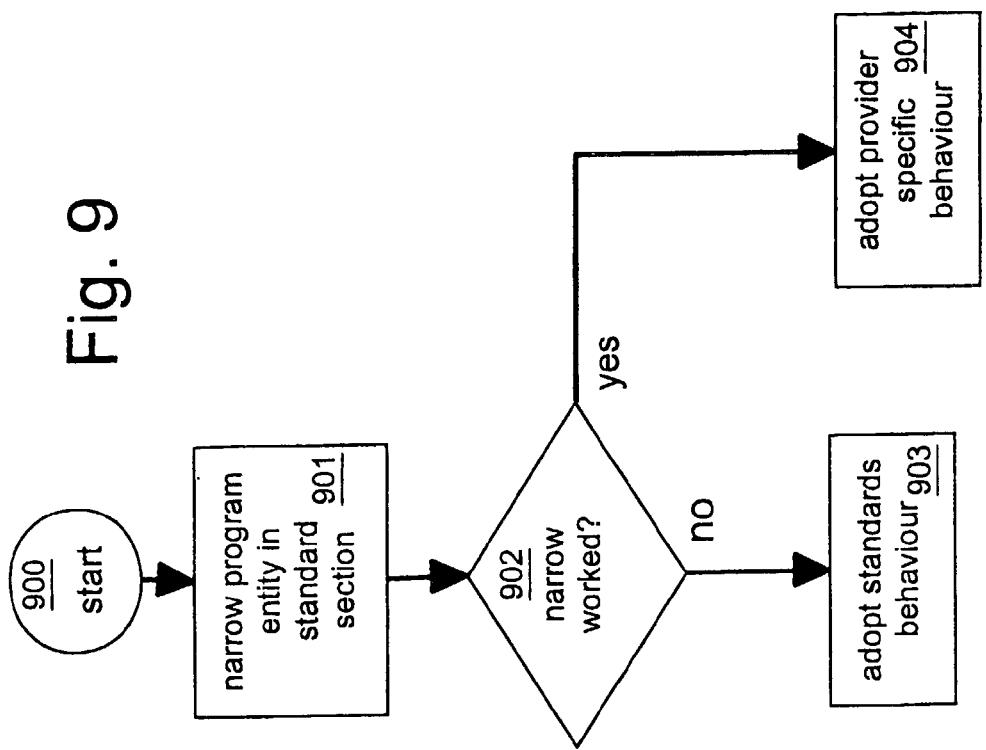
FIG. 9 is a flow diagram of additional processing, in a server, when receiving a context included with a flow according to the preferred embodiment of the present invention.

FIG. 9 shows further processing that may be optionally carried out in a client/server process before adopting provider specific, nonstandard, behaviour if the processing of FIG. 7b was also carried out. However, the functionality that it provides can also be provided by the processing described for FIG. 8a. At step 901 a reference to a standard program entity instance is obtained from the standard section of the context. If this program entity instance is from a process of the same provider it will be possible to narrow it to a more specialised program entity of the provider. At step 902 an attempt is made to narrow the program entity accordingly. If this succeeds processing continues to step 904 where provider specific behaviour is adopted, if it fails processing continues to step 903 where standard behaviour is adopted.

Note that although FIGS. 7, 8a, 8b and 8c specify an order in which steps are carried out and therefore imply an order in which the data appears in the provider specific data, the actual order used is arbitrary.

The present method therefore provides the ability for a client or server, on receipt of a context associated with a client/server flow, to identify whether or not the provider specific data was included by the server/client from which the flow was received. This enables client and servers that implement a standard, to adopt nonstandard behaviour when communicating with servers and clients that can also adopt the same nonstandard behaviour. For this purpose the invention makes use of a free format provider specific section, included in a standard specified context, in which information is flowed between clients and servers. Such a section is included the CORBA standard flows as set forth by the OMG, but the present invention could apply to any standard that provides this type of information flow. In addition, although the preferred embodiment is only described in terms of C++ objects the invention also applies to any program entity that can be the target of a request from a different process. For example an program entity could be a Java bean, such as an Enterprise JavaBean (Trademark of Sun Microsystems, Inc.).

The invention claimed is:

1. A data processing method for running in a process on a data processing system, the method comprising:
    building, in a current process, a context for inclusion in a flow to a different process in the same or a different data processing system, wherein the context comprises optional data; and
    flowing the context to the different process as part of the flow wherein the flow is a request to a program entity, wherein building the context for inclusion in the flow to the different process comprises:

providing an identifier in the optional data in the context, wherein the identifier has a value that identifies a target program entity of the flow only if the flow originates in the current process, and wherein the identifier has a value other than a value that identifies the target program entity of the flow if the flow originated in a different process from the current process;

wherein the different process processes the request based on the optional data in the context and responsive to determining that the current process added the optional data to the context, adopts nonstandard behavior in communications with the current process.

2. The data processing method as claimed in claim 1, wherein the optional data further comprises a flow direction indicator for identifying the flow as one of a request to or a reply from the program entity.

3. The data processing method as claimed in claim 1, wherein the optional data further comprises level identification information for indicating the level of function that is supported by the current process.

4. The data processing method as claimed in claim 1, wherein the context further comprises compulsory data and wherein the compulsory data comprises a program entity reference to a further program entity which conforms to a standard type and also to a nonstandard type that is an extension to the standard type.

5. The data processing method of claim 1, wherein the optional data of the context is pre-defined by the CORBA standard of the Object Management Group Inc.

6. The data processing method as claimed in claim 5, wherein the flow is a transactional flow and the context is a transaction context.

7. A data processing method for running in a process on a data processing system, the data processing method comprising:

receiving a context included with a flow from a different process in the same or a different processing system, wherein the context comprises optional data and wherein the flow is a request to or a reply from a first program entity, wherein the optional data comprises identity information, which identifies a second program entity;

responsive to the first and second program entities being the same, determining that the different process also added the optional data to the context; and responsive to determining that the different process also added the optional data to the context, processing the request or reply based on the optional data in the context and adopting nonstandard behavior in communications with the different process.

8. The data processing method as claimed in claim 7, wherein the optional data further comprises a flow direction indicator and the determining step is further responsive to the flow direction indicator correctly identifying the flow as one of a request to or a reply from the first program entity.

9. The data processing method as claimed in claim 3, wherein the optional data further comprises level identification information and the adopting non-standard behavior method is further responsive to the level identification information being a particular value.

10. The data processing method according to claim 9, wherein the adopting nonstandard behavior step adopts one of a plurality of patterns of nonstandard behavior based on the level identification information.

11. The data processing method as claimed in claim 7, wherein:

the context further comprises pre-defined compulsory data wherein compulsory data comprises a program entity reference to a third program entity which conforms to a standard type; and the adopting non-standard behavior step is further responsive to the third program entity also conforming to a nonstandard type that is an extension to the standard type.

12. The data processing method of claim 7, further comprising:

adding additional data to the optional data only if the first and second program entities are the same.

13. A computer program product comprising instructions which, when executed on a data processing system causes said system to carry out a method comprising:

building, in a current process, a context for inclusion in a flow to a different process in the same or a different data processing system, wherein the context comprises optional data; and flowing the context to the different process as part of the flow wherein the flow is a request to a program entity, wherein building the context for inclusion in the flow to the different process comprises:

providing an identifier in the optional data in the context, wherein the identifier has a value that identifies a target program entity of the flow only if the flow originates in the current process, and wherein the identifier has a value other than a value that identifies the target program entity of the flow if the flow originated in a different process from the current process;

wherein the different process processes the request based on the optional data in the context and responsive to determining that the current process added the optional data to the context, adopts nonstandard behavior in communications with the current process.

14. The computer program product as claimed in claim 13, wherein the optional data further comprises a flow direction indicator for identifying the flow as one of a request to or a reply from the program entity.

15. The computer program product as claimed in claim 13, wherein the optional data further comprises level identification information for indicating the level of function that is supported by the current process.

16. The computer program product as claimed in claim 13, wherein the context further comprises compulsory data and wherein the compulsory data comprises a program entity reference to a further program entity which conforms to a standard type and also to a nonstandard type that is an extension to the standard type.

17. A computer program product comprising instructions which, when executed on a data processing system causes said system to carry out a method comprising:

receiving a context included with a flow from a different process in the same or a different processing system, wherein the context comprises optional data and wherein the flow is a request to or a reply from a first program entity, wherein the optional data comprises identity information, which identifies a second program entity;

responsive to the first and second program entities being the same, determining that the different process also added the optional data to the context; and responsive to determining that the different process also added the optional data to the context, processing the request or reply based on the optional data in the context and adopting nonstandard behavior in communications with the different process.

18. The computer program product as claimed in claim 17, wherein the optional data further comprises a flow direction indicator and the determining step is further responsive to the flow direction indicator correctly identifying the flow as one of a request to or a reply from the first program entity.

19. The computer program product as claimed in claim 17, wherein the optional data further comprises level identification information and the adopting non-standard behavior method is further responsive to the level identification information being a particular value.

20. The computer program product according to claim 19, wherein the adopting nonstandard behavior step adopts one of a plurality of patterns of nonstandard behavior based on the level identification information.

21. The computer program product as claimed in claim 17, wherein:
the context further comprises compulsory data wherein compulsory data comprises a program entity reference to a third program entity which conforms to a standard type; and
the adopting non-standard behavior step is further responsive to the third program entity also conforming to a nonstandard type that is an extension to the standard type.

22. The computer program product of claim 13 wherein the optional data of the context is pre-defined by the CORBA standard of the Object Management Group Inc.

23. The computer program product as claimed in claim 22, wherein the flow is a transactional flow and the context is a transaction context.

24. The computer program product as claimed in claim 17, further comprising the step:
adding additional data to the optional data only if the first and second program entities are the same.

25. A data processing system for running a process, the system comprising:
means for building a context for inclusion in a flow to a different process in the same or a different data processing system, wherein the context comprises optional data; and
means for flowing the context to the different process as part of a flow wherein the flow is a request to a program entity, wherein building the context for inclusion in the flow to the different process comprises:
providing an identifier in the optional data in the context, wherein the identifier has a value that identifies a target program entity of the flow only if the flow originates in the current process, and wherein the identifier has a value other than a value that identifies the target program entity of the flow if the flow originated in a different process from the current process;
wherein the different process processes the request based on the optional data in the context and responsive to determining that the current process added the optional data to the context, adopts nonstandard behavior in communications with the current process.

26. The data processing system as claimed in claim 25, wherein the optional data further comprises a flow direction indicator for identifying the flow as one of a request to or a reply from the program entity.

27. The data processing system as claimed in claim 25, wherein the optional data further comprises level identification information for indicating the level of function that is supported by the current process.

28. The data processing system as claimed in claim 25, wherein the context further comprises compulsory data and wherein the compulsory data comprises a program entity reference to a further program entity which conforms to a standard type and also to a nonstandard type that is an extension to the standard type.

29. The data processing system of claim 25, wherein the optional data of the context is pre-defined by the CORBA standard of the Object Management Group Inc.

30. The data processing system as claimed in claim 29, wherein the flow is a transactional flow and the context is a transaction context.

31. A data processing system for running a process, the data processing system comprising:
means for receiving a context included with a flow from a different process in the same or a different processing system, wherein the context conforms to a pre-defined standard and comprises optional data and wherein the flow is a request to or a reply from a first program entity, wherein the optional data comprises identity information, which identifies a second program entity; and
means, responsive to the first and second program entities being the same, for determining that the different process also added the optional data to the context; and
means responsive to determining that the different process also added the optional data to the context, for processing the request or reply based on the optional data in the context and adopting nonstandard behavior in communications with the different process.

32. The data processing system as claimed in claim 31, wherein the optional data further comprises a flow direction indicator and the means for determining is further responsive to the flow direction indicator correctly identifying the flow as one of a request to or a reply from the program entity.

33. The data processing system as claimed in claim 31, wherein the optional data further comprises level identification information and the means for adopting non-standard behavior is further responsive to the level identification information being a particular value.

34. The data processing system according to claim 33, wherein the means for adopting nonstandard behavior adopts one of a plurality of patterns of nonstandard behavior based on the level identification information.

35. The data processing system as claimed in claim 31, wherein:
the context further comprises compulsory data wherein compulsory data comprises a program entity reference for a third program entity which conforms to a standard type; and
the means for adopting non-standard behavior is further responsive to the third program entity also conforming to a nonstandard type that is an extension to the standard type.

36. The data processing system of claim 31, further comprising:
means for adding additional data to the optional data only if the first and second program entities are the same.

* * * * *